US007333615B1

(12) United States Patent
Jarboe et al.

(10) Patent No.: US 7,333,615 B1
(45) Date of Patent: Feb. 19, 2008

(54) ENCRYPTION BETWEEN MULTIPLE DEVICES

(75) Inventors: Andre D. Jarboe, Stone Mountain, GA (US); Jeffrey L. Mitchell, Columbus, OH (US); Barrett M. Kreiner, Norcross, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 649 days.

(21) Appl. No.: 10/183,908

(22) Filed: Jun. 26, 2002

(51) Int. Cl.
*H04L 9/00* (2006.01)
(52) U.S. Cl. .................................................. 380/277
(58) Field of Classification Search ................ 280/277; 713/170; 380/255, 277, 45; 705/67
See application file for complete search history.

(56) References Cited

U.S. PATENT DOCUMENTS

| 4,328,414 | A | | 5/1982 | Atalla ......................... 235/380 |
| 5,646,998 | A | | 7/1997 | Stambler ..................... 380/25 |
| 5,764,768 | A | * | 6/1998 | Spelman et al. ............ 725/117 |
| 5,793,302 | A | | 8/1998 | Stambler ............... 340/825.34 |
| 6,128,735 | A | * | 10/2000 | Goldstein et al. ........... 713/166 |
| 6,675,153 | B1 | * | 1/2004 | Cook et al. .................... 705/74 |
| 6,836,765 | B1 | * | 12/2004 | Sussman ....................... 705/75 |
| 2003/0005285 | A1 | * | 1/2003 | Graunke ...................... 713/153 |
| 2003/0182559 | A1 | * | 9/2003 | Curry et al. ................. 713/189 |
| 2006/0031173 | A1 | * | 2/2006 | Rajaram ....................... 705/64 |

OTHER PUBLICATIONS

Secure Electronic Transaction (SET) Specification, Jun. 1996 Draft.*

Steiner, Jennifer G. et al., "Kerberos: An Authenticiation Service For Open Network Systems," Mar. 30, 1988.

Miller, S.P., et al., "Kerberos Authentication and Authorization System," Section E.2.1, Project Athena Technical Plan, MIT, Copyright 1985; Oct. 27, 1988.

*Revised Text of CD 9798-2* "Entity Authentication Mechanisms, Part 2: Entity Authentication Using Symmetric Techniques," ISO/IECJTC1/SC27 N, Jun. 21, 1990.

"*PKCS#7*: Cryptographic Message Syntax Standard" RSA Data Security, Inc., Redwood City, CA, Jun. 3, 1991.

Banking—Requirements For Message Authentication (Wholesale)—International Standard, ISO 8730, Second Edition, May 15, 1990.

Beker, Henry, et al., "Key Management For Secure Electronic Funds Transfer In A Retail Environment," Racal Research Ltd., Reading, Berkshire, England, undated.

* cited by examiner

*Primary Examiner*—Emmanuel L. Moise
*Assistant Examiner*—Ali S Abyaneh
(74) *Attorney, Agent, or Firm*—Withers & Keys, LLC

(57) ABSTRACT

A first device receives first information and second information, encrypts the first information with a first set of encryption keys, and encrypts a combination of the second information and the encrypted first information with a second set of encryption keys into a first message. The first device may send the first message to a second device that receives the first message, decrypts the first message with a third set of encryption keys to yield the second information and the encrypted first information, determines a third information based on the second information, and encrypts into a second message, a combination of the third information and the encrypted first information, with a fourth set of encryption keys. The second message may be sent to a third device for decryption.

10 Claims, 6 Drawing Sheets

ENCRYPTION BETWEEN MULTIPLE DEVICES

FIELD OF THE INVENTION

The invention generally relates to the field of encryption. More particularly, the invention relates to encryption between multiple devices.

BACKGROUND OF THE INVENTION

The Internet has become increasingly popular in recent years and along with it, so has on-line Internet shopping. To accommodate demand for on-line shopping, many merchants have implemented Internet web servers with web pages for selling items. The web pages often describe the item and item price. With such web pages, a customer can browse to a merchant web page, view an item description and price, and select to order an item. The merchant web page may also include a field for entry of a credit card account number to be used for payment. The customer may enter their credit card account number and send it along with a purchase order to the merchant server (i.e., in a message).

Because the message is sent over the Internet, many systems implement encryption to provide for security of the credit card account number. That is, typically the credit card account number and purchase order are encrypted by the customer computer before being sent to the merchant server. The merchant server receives the encrypted message and decrypts the message to determine the purchase order and the credit card account number. After processing the purchase order to determine an invoice amount, the merchant server encrypts the credit card account number and the invoice amount and sends that encrypted message to a credit card server.

As can be seen, the merchant server has access to the unencrypted credit card account number of the customer. This can be disadvantageous for several reasons. For example, the merchant server may contain many credit card account numbers and therefore, may be ripe for attack by hackers. Further, once a merchant receives a credit card account number and a purchase order, an unscrupulous merchant may send a larger invoice amount than was agreed to by the customer. Moreover, an unscrupulous merchant may send an invoice amount to the credit card server for a purchase that was never made by the customer. That is, because the credit card server receives the message from the merchant server without any certification from the customer computer, the credit card server cannot verify that the purchase was actually made by the customer.

In view of the foregoing, there is a need for an encryption system and method that does not provide unencrypted credit card account numbers to a merchant server.

SUMMARY OF THE INVENTION

The invention is directed to encryption between multiple devices. A first device receives first information and second information, encrypts the first information with a first set of encryption keys, and encrypts a combination of the second information and the encrypted first information with a second set of encryption keys into a first message. The first device may send the first message to a second device.

The second device receives the first message, decrypts the first message with a third set of encryption keys to yield the second information and the encrypted first information, determines a third information based on the second information, and encrypts into a second message, a combination of the third information and the encrypted first information, with a fourth set of encryption keys. The third set of encryption keys enables decryption of information encrypted with the second set of encryption keys. The second message may be sent to a third device.

The third device receives the second message, decrypts the second message with a fifth set of encryption keys to yield the second information and the encrypted first information, and decrypts the encrypted first information with a sixth set of encryption keys to yield the first information. The fifth set of encryption keys enables decryption of information encrypted with the fourth set of encryption keys and the sixth set of encryption keys enables decryption of information encrypted with the first set of encryption keys.

The above-listed features, as well as other features, of the invention will be more fully set forth hereinafter.

BRIEF DESCRIPTION OF THE DRAWINGS

The invention is further described in the detailed description that follows, by reference to the noted plurality of drawings by way of non-limiting illustrative embodiments of the invention, in which like reference numerals represent similar parts throughout the several views of the drawings, and wherein.

DETAILED DESCRIPTION OF ILLUSTRATIVE EMBODIMENTS

Figure 1:
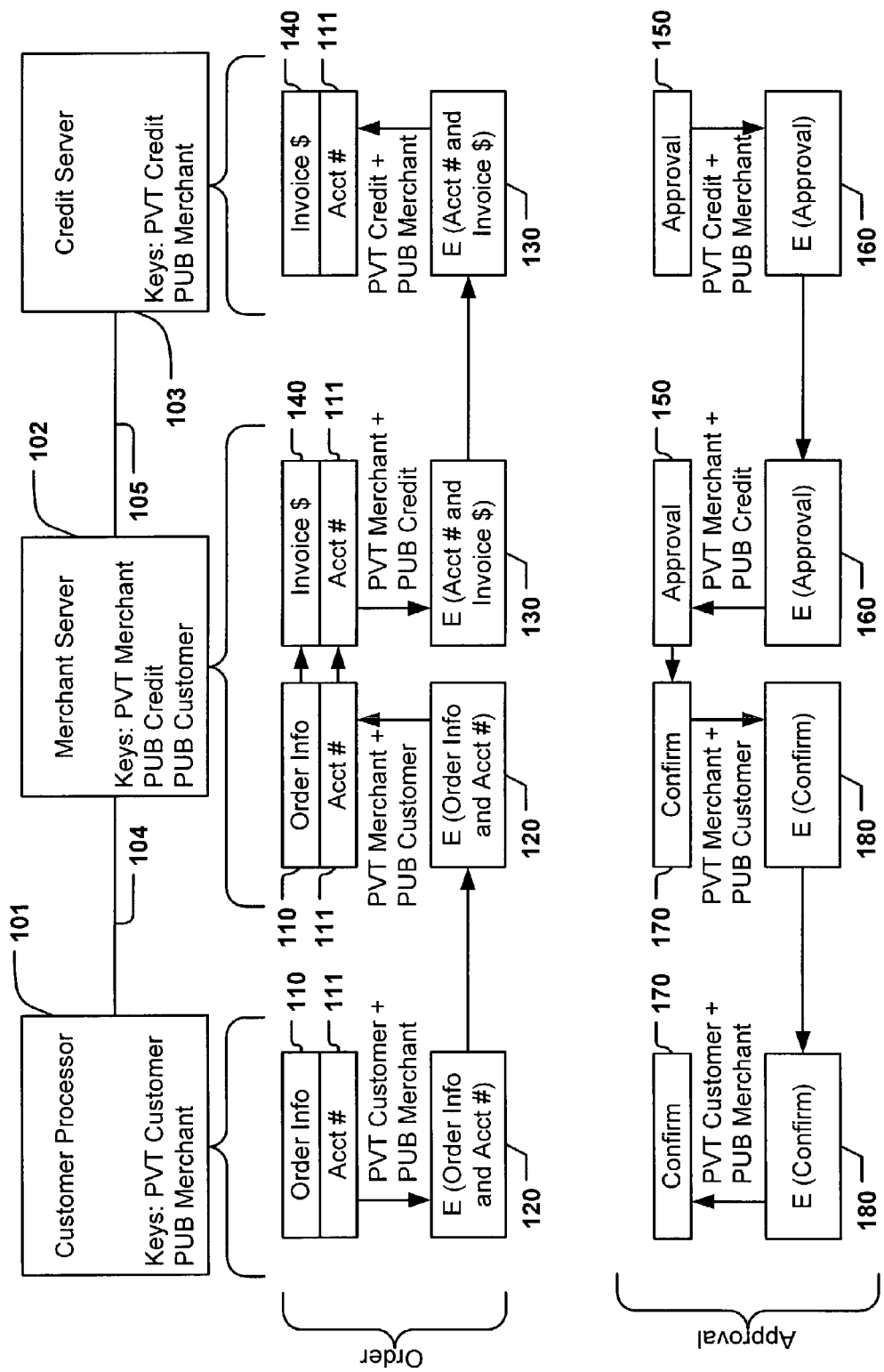
FIG. 1 is a diagram of a prior art encryption system and method for ordering and approving an on-line purchase.

FIG. 1 is a diagram of a prior art encryption system and method for ordering and approving an on-line purchase. As shown in FIG. 1, customer processor 101 is in communication with merchant server 102 via communication link 104. Merchant server 102 is further in communication with a credit server 103 via a communication link 105.

Customer processor 101 may include a computer and a browser executing on the computer and is associated with a customer in an on-line purchase. Communication links 104 and 105 may be the Internet, a local area network, a wide area network, and the like. Merchant server 102 is associated with a merchant, such as, for example, BellSouth Corp. and credit server 103 is associated with a credit company, such as, for example, VISA International.

In a typical Internet on-line purchase, customer processor 101 receives an order from a customer, via a user interface (not shown). For example, the customer may browse to "www.bellsouth.com" to purchase a phone. The customer may view phone descriptions and pricing and select to purchase a phone. Customer processor 101 receives purchase order information 110, such as, for example, a model number, a phone description, and the like. Customer processor 101 may further receive a credit card account number 111 from the user interface. Order information 110 and credit card account number 111 are typically in clear text form and as such, can be read by a processor, a server, and the like.

Rather than simply sending order information 110 and credit card account number 111 to merchant server 102 in their clear text form, customer processor 101 typically encrypts order information 110 and credit card account number 111 to yield encrypted order information and credit card account number 120, shown as E(Order Information and Account Number) 120. Such encrypted information is not in clear text form, but rather is encrypted into another form that typically is not readable until decrypted back into clear text. It is this encrypted form that is sent to merchant server 102 via communication link 104, thereby providing some protection of the information as it travels via communication link 104.

The encryption is typically performed with Public Key Infrastructure (PKI). PKI enables users of non-secure public networks, such as the Internet, to securely and privately exchange data through the use of a public and a private cryptographic key pair that is obtained and shared through a trusted authority. PKI also provides for a digital certificate that can identify an individual or an organization.

PKI uses public key cryptography and typically includes a certificate authority, a registration authority, and a directory service (each not shown). The certificate authority issues and verifies a digital certificate. A digital certificate may include a public key or information about the public key, a name, a serial number, an expiration date, a digital signature of the certificate-issuing authority, and the like.

The registration authority acts as a verifier for the certificate authority before a digital certificate is issued. The directory service stores certificates (with their associated public keys) so that authenticating users can determine others' public keys.

In public key cryptography, a public and private key are created simultaneously using the same algorithm by the certificate authority. The private key is given only to the requesting party and the public key is made publicly available (as part of a digital certificate) in a directory that all parties can access. The private key is never shared with anyone or sent across the Internet. The private key is used to decrypt a message that has been encrypted with its corresponding public key, by someone else (who can find out what your public key is from a public directory). In addition to encrypting messages (which ensures privacy), a party can authenticate itself (to ensure that it is really that party who sent the message) by using their private key to encrypt a digital certificate. On the Internet, PKI is typically implemented within Hypertext Transfer Protocol (S-HTTP). While PKI is well suited for communication between two devices, it is less than optimized for use in exchanges involving more than two devices, as described in more detail below.

As shown in FIG. 1, each device includes keys to perform the public key cryptography. Customer processor 101 includes a private key, shown as PVT Customer, and a public key of merchant server 102, shown as PUB Merchant. Merchant server 102 includes a private key, shown as PVT Merchant, a public key of credit server 103, shown as PUB Credit, and a public key of customer processor 101, shown as PUB Customer. Credit server 103 includes a private key, shown as PVT Credit, and a public key of merchant server 102, shown as PUB Merchant. The keys can be provided by the certificate authority as described above.

Returning now to the transaction, customer processor 101 sends encrypted order information and credit card account number 120 to merchant server 102. As described above, because the information is encrypted before being sent, the information is protected against being read by an unauthorized device.

Merchant server 102 receives encrypted order information and credit card account number 120. Merchant server 102 decrypts, with its private key and the public key of the customer processor, encrypted order information and credit card account number 120 to yield order information 110 and credit card account number 111. Order information 110 and credit card account number 111 are in clear text form and therefore, merchant server 102 can read order information 110 and credit card account number 111. As can be seen, the information transmitted over communication link 104 is protected by encryption and then decrypted upon receipt at merchant server 102.

While this encryption technique provides some security, it has several disadvantages. For example, because merchant server 102 contains credit card account number 111 in unencrypted form, hackers may illicitly access merchant server 102 and steal credit card account numbers. Also, while most merchants are trustworthy, an unscrupulous merchant may use credit card account number 111 for a fraudulent transaction.

Returning to the transaction, merchant server 102 uses order information 110 to determine a monetary invoice amount 140. Merchant server 102 may use various techniques to determine monetary invoice amount 140. For example, merchant server 102 may use a pricing database that is more up-to-date than the merchant web pages and therefore, may determine a monetary invoice amount 140 that is different than the amount agreed to the by the customer. Also, there is nothing preventing an unscrupulous merchant from sending a fraudulent monetary invoice amount to credit server 103.

After determining monetary invoice amount 140, merchant server 102 encrypts, with its private key and the public key of the credit server, credit card account number 111 and monetary invoice amount 140 to yield encrypted credit card account number and monetary invoice amount 130, shown as E(Acct # and Invoice $) 130. Again, such encrypted information is not in clear text form, rather it is encrypted, thereby protecting the information for communication over communication link 105.

Merchant server 102 sends encrypted credit card account number and monetary invoice amount 130 to credit server 103. Credit server 103 receives encrypted credit card account number and monetary invoice amount 130.

Credit server 103 decrypts, with its private key and the public key of the merchant server, encrypted credit card account number and monetary invoice amount 130 to yield credit card account number 111 and monetary invoice amount 140. Credit server 103 uses credit card account number 111 and monetary invoice amount 140, which are now in clear text form, to determine whether or not to approve the purchase transaction.

If approved, credit server 103 generates an approval 150 that is encrypted using the private key of the credit server the public key of the merchant server, and sent to merchant server 102 as encrypted approval 160. Merchant server 102 receives and decrypts encrypted approval 160, using the private key of the merchant server and the public key of the credit server, to yield approval 150. Merchant server 102 may generate a confirmation 170 for the customer, encrypt confirmation 170, using the private key of the merchant server and the public key of the customer server, to yield encrypted confirmation 180. Merchant server 102 may then send encrypted confirmation 180 to customer processor 101.

Customer processor 101 receives and decrypts encrypted confirmation 180, using the private key of the customer server and the public key of the merchant server, to yield confirmation 170. As can be seen, merchant server 102 has unencrypted access to all approval information sent by credit server 103. Therefore, an unscrupulous merchant may provide fraudulent approval information to the customer. As can be seen, conventional PKI has several disadvantages when applied to communications between multiple devices, such as often occurs with an on-line purchase.

Figure 2:
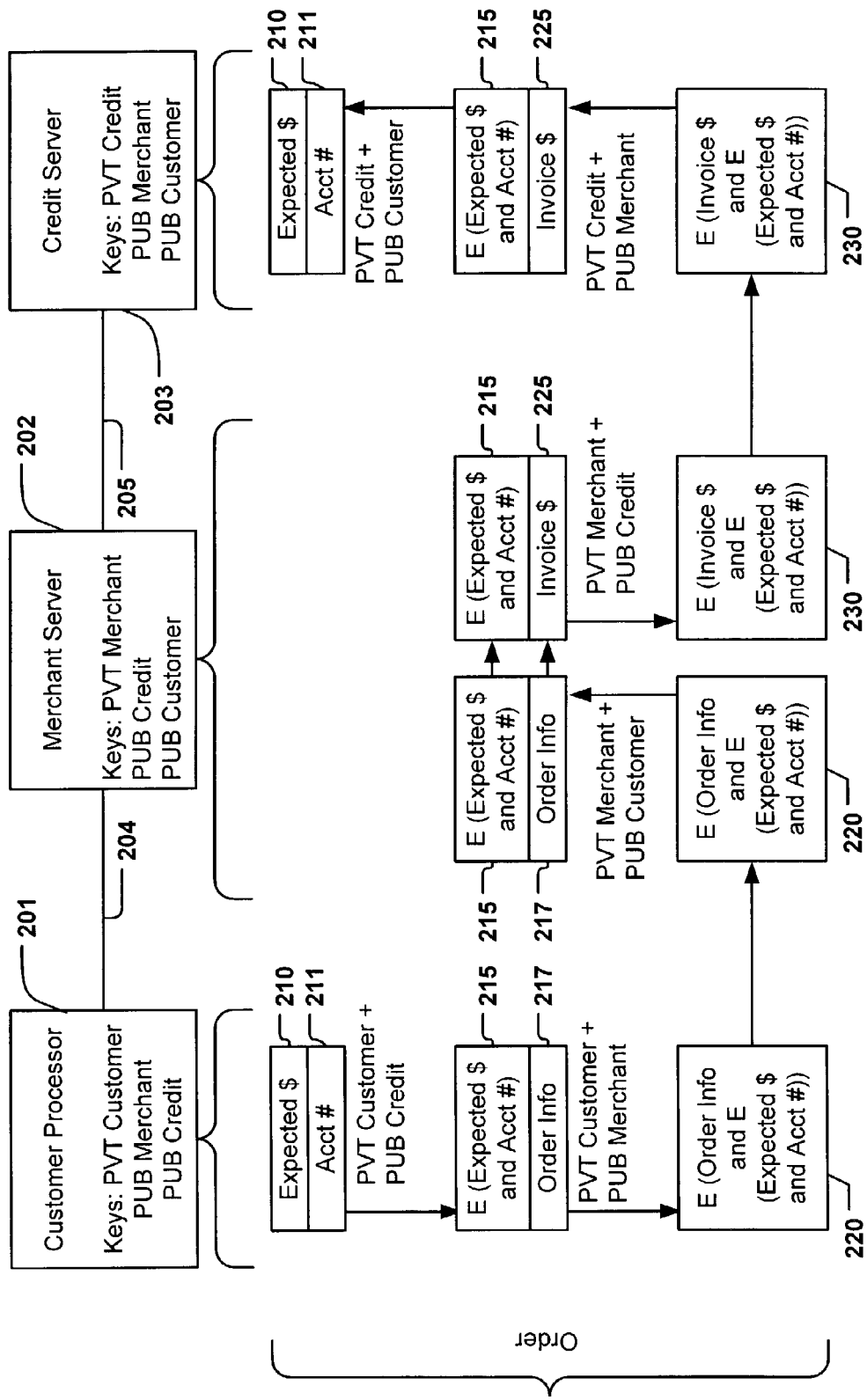
FIG. 2 is a diagram of an illustrative encryption system and method for ordering an on-line purchase, in accordance with an embodiment of the invention.

FIG. 2 is a diagram of an illustrative encryption system and method for ordering an on-line purchase. As shown in FIG. 2, a customer processor 201 is in communication with a merchant server 202 via a communication link 204. Merchant server 202 is further in communication with a credit server 203 via a communication link 205.

As shown in FIG. 2, each processor (or server) includes keys to perform public key cryptography. Customer processor 201 includes a private key, shown as PVT Customer, a public key of merchant server 202, shown as PUB Merchant, and a public key of credit server 203, shown as PUB Credit. Merchant server 202 includes a private key, shown as PVT Merchant, a public key of credit server 203, shown as PUB Credit, and a public key of customer processor 201, shown as PUB Customer. Credit server 203 includes a private key, shown as PVT Credit, a public key of merchant server 202, shown as PUB Merchant, and a public key of customer processor 201, shown as PUB Customer.

Figure 4:
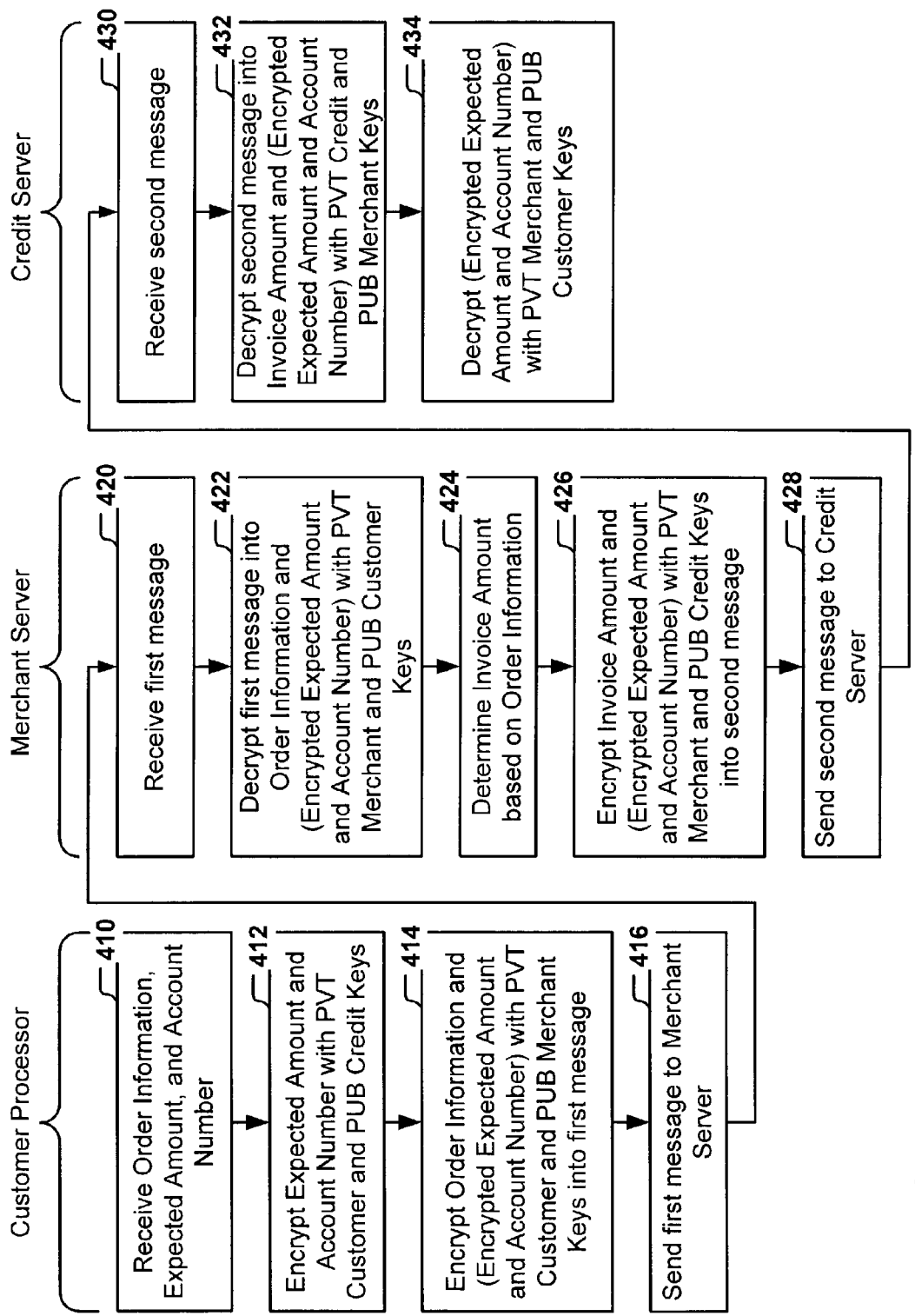
FIG. 4 is a flow diagram of an illustrative method for encrypting an on-line purchase order.

An on-line purchase may be performed by the customer in a similar fashion to that described in connection with FIG. 1. Customer processor 201, however, rather than performing a conventional PKI encryption on information sent to merchant server 202, performs a first encryption on a first portion of the information and a second encryption on a combination of a second portion of the information and the encrypted first portion. As such, merchant server 202 only has access to a portion of the information in its unencrypted state. That is, merchant server 202 has access to the second portion in its unencrypted state, but does not have access to the first portion in its unencrypted state, as described in more detail below with reference to FIGS. 2 and 4.

At step 410, customer processor 201 receives order information 217, an expected monetary payment amount 210, and a credit card account number 211 from the user interface of customer processor 201. As described in more detail below, expected monetary payment amount 210 provides credit server 203 with a way to check that the monetary invoice amount is not greater than expected or agreed to by the customer.

At step 412, customer processor 210 encrypts, with its private key and the public key of the credit server, expected monetary payment amount 210 and credit card account number 211 to yield encrypted expected monetary payment amount and credit card account number 215, shown as E(Expected $ and Acct #) 215. Encrypting expected monetary payment amount 210 and credit card account number 211 with the public key of credit server 203 inhibits merchant server 202 from accessing or modifying expected monetary payment amount 210 and credit card account number 211, as described in more detail below.

At step 414, customer processor 201 encrypts, with its private key and the public key of the merchant server, encrypted expected monetary payment amount and credit card account number 215 and order information 217 to produce a first message 220, shown as E(Order Info and E(Expected $ and Acct #)) 220. As can be seen, first message 220 includes a first portion (i.e., Order Information) that is encrypted with a first set of keys and a second portion (i.e., Expected monetary payment Amount and Credit Card Account Number) that is encrypted with the first set of keys and a second set of keys, thereby making each portion accessible to a different device, as described in more detail below.

At step 416, customer processor 201 sends first message 220 to merchant server 202. At step 420, merchant server 202 receives first message 220.

At step 422, merchant server 202 decrypts, with its private key and the public key of the customer processor, first message 220 to yield order information 217 and encrypted expected monetary payment amount and credit card account number 215. Order information 217 is in unencrypted (e.g., clear text) form and is thereby intelligible to merchant server 202. Encrypted expected monetary payment amount and credit card account number 215 is in encrypted form and therefore is not intelligible to merchant server 202. Further, because encrypted expected monetary payment amount and credit card account number 215 was encrypted with the private key of the customer processor and the public key of the credit server, merchant server 202 is not authorized to decrypt encrypted expected monetary payment amount and credit card account number 215.

As can be appreciated, merchant server 202 does not have access to credit card account number 211 in its unencrypted form. Rather, merchant server 202 contains encrypted expected monetary payment amount and credit card account number 215, which was encrypted with the private key of the customer processor and the public key of the credit server and therefore, typically cannot be decrypted by merchant server 202. As such, merchant server 202 typically contains only encrypted credit card account numbers and therefore, may be a less likely target for hacker attack. Even if such an attack occurs, only encrypted credit card information is available.

Further, merchant server 202 does not have access to expected monetary payment amount 210 in its unencrypted form, and therefore, is less likely to be fraudulently modified by an unscrupulous merchant.

At step 424, merchant server 202 uses order information 217 to determine a monetary invoice amount 225 for use in requesting credit approval.

At step 426, merchant server 202 encrypts, with its private key and the public key of the credit server, monetary invoice amount 225 and encrypted expected monetary payment amount and credit card account number 215 into a second message 230, shown as E(Invoice $ and E(Expected $ and Acct #)) 230.

At step 428, merchant server 202 sends second message 230 to credit server 203. At step 430, credit server 203 receives second message 230.

At step 432, credit server 203 decrypts, with its private key and the public key of the merchant server, second message 230 to yield monetary invoice amount 225 and encrypted expected monetary payment amount and credit card account number 215.

At step 434, credit server 203 decrypts, with its private key and the public key of the customer server, encrypted expected monetary payment amount and credit card account number 215 to yield expected monetary payment amount 210 and credit card account number 211.

Credit server 203 may use credit card account number 211, monetary invoice amount 225, and expected monetary payment amount 210 to determine whether or not to approve credit for the purchase transaction. In addition, credit server 203 may determine whether monetary invoice amount 225 is greater than expected monetary payment amount 210, thereby providing to the customer a level of security that the merchant has not fraudulently generated the monetary invoice amount. Moreover, because encrypted expected monetary payment amount and credit card account number 215 has been encrypted using a key of the customer processor 201, credit server 203 is provided some assurance that the credit request is associated with a legitimate purchase order from a customer rather than a purchase order fraudulently fabricated by an unscrupulous merchant.

Figure 3:
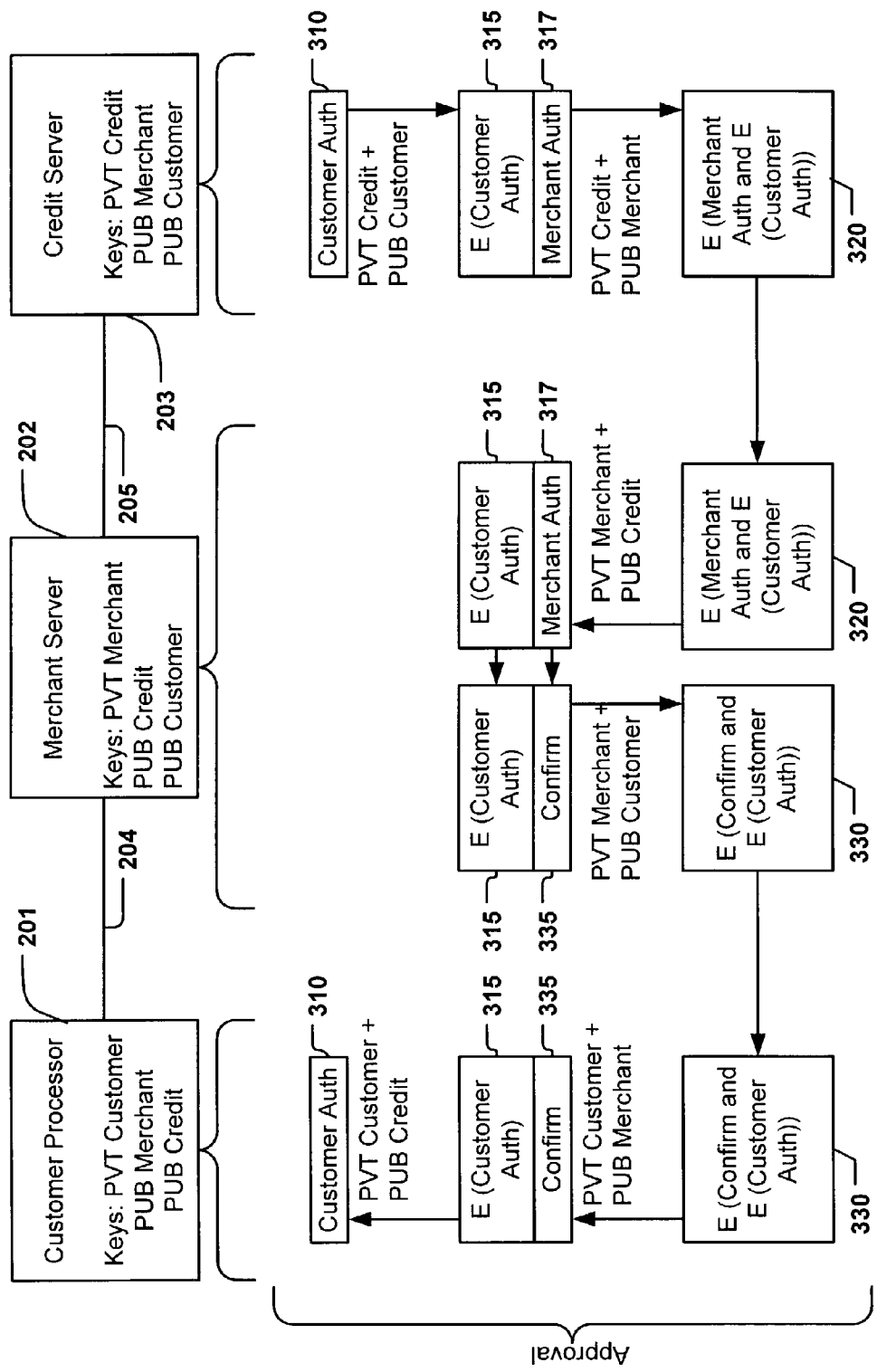
FIG. 3 is a diagram of an illustrative encryption system and method for approving an on-line purchase, in accordance with an embodiment of the invention.
Figure 5:
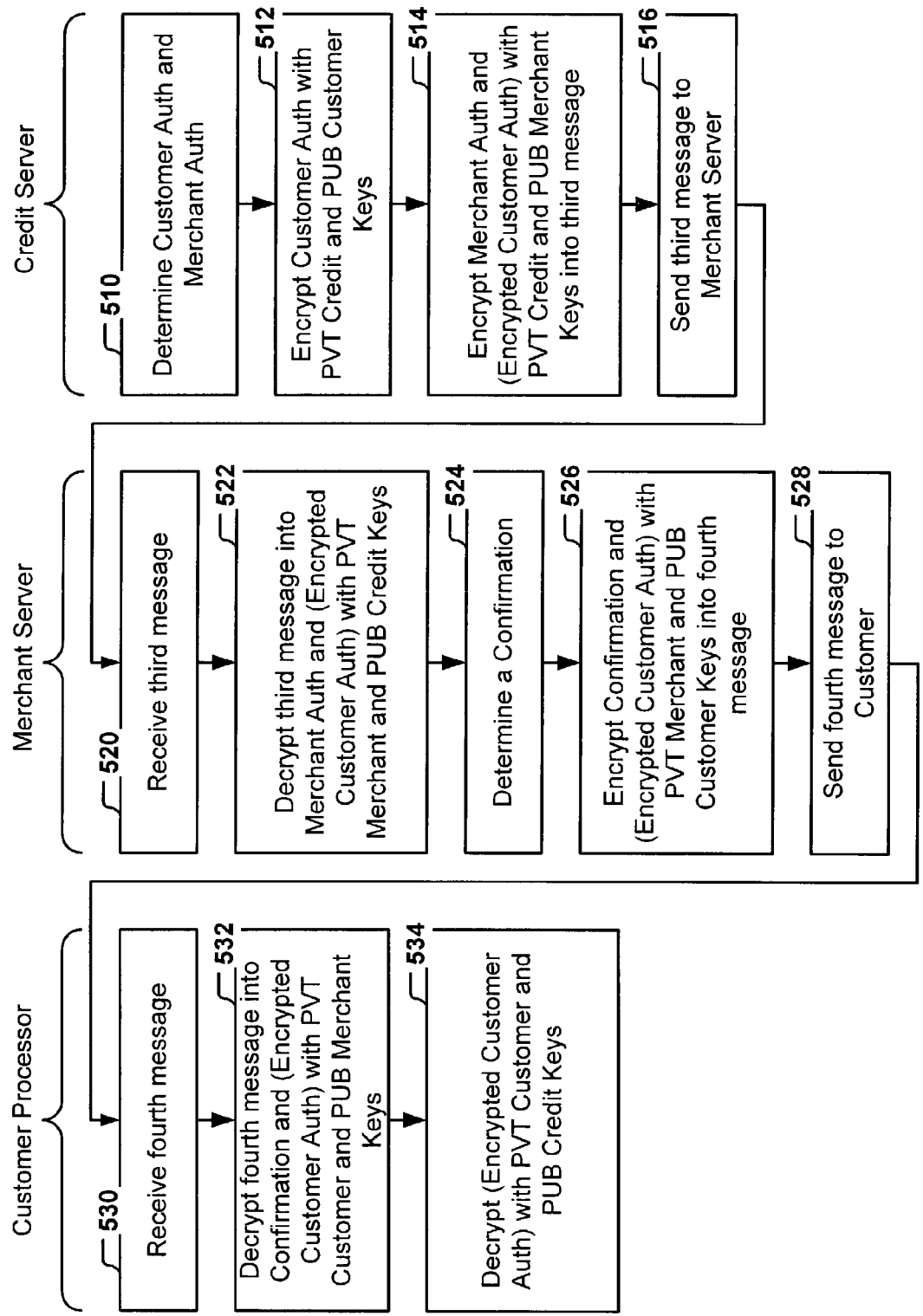
FIG. 5 is a flow diagram of an illustrative method for encrypting an on-line purchase approval.

If the transaction is approved, credit server 203 generates an authorization which may be sent to merchant server 202. Moreover, credit server 203 may generate an authorization for the merchant and another authorization for the customer. A similar encryption technique may be employed to inhibit the merchant from modifying the authorization for the customer, as described in more detail below in connection with FIGS. 3 and 5.

At step 510, credit server 203 generates or determines a customer authorization 310 and a merchant authorization 317.

At step 512, credit server 203 encrypts, with its private key and the public key of the customer processor, customer authorization 310 to yield encrypted customer authorization 315, shown as E(Customer Auth) 315.

At step 514, credit server 203 encrypts, with its private key and the public key of the merchant server, encrypted customer authorization 315 and merchant authorization 317 to produce a third message 320, shown as E(Merchant Auth and E(Customer Auth)) 320.

At step 516, credit server 203 sends third message 320 to merchant server 202. At step 520, merchant server 202 receives third message 320.

At step 522, merchant server 202 decrypts, with its private key and the public key of the credit server, third message 320 to yield merchant authorization 317 and encrypted customer authorization 315. As can be appreciated, merchant server 202 does not have access to customer authorization 310 in its unencrypted form.

At step 524, merchant server 202 determines a confirmation number 335 to be sent to customer processor 203.

At step 526, merchant server 202 encrypts, with its private key and the public key of the customer processor, confirmation number 335 and encrypted customer authorization 315 into a fourth message 330, shown as E(Confirm and E(Customer Auth)) 330.

At step 528, merchant server 202 sends fourth message 330 to customer processor 201. At step 530, customer processor 201 receives fourth message 330.

At step 532, customer processor 201 decrypts, with its private key and the public key of the merchant server, fourth message 330 to yield confirmation 335 and encrypted customer authorization 315.

At step 534, customer processor 201 decrypts, with its private key and the public key of the credit server, encrypted customer authorization 315 to yield customer authorization 310.

Figure 6:
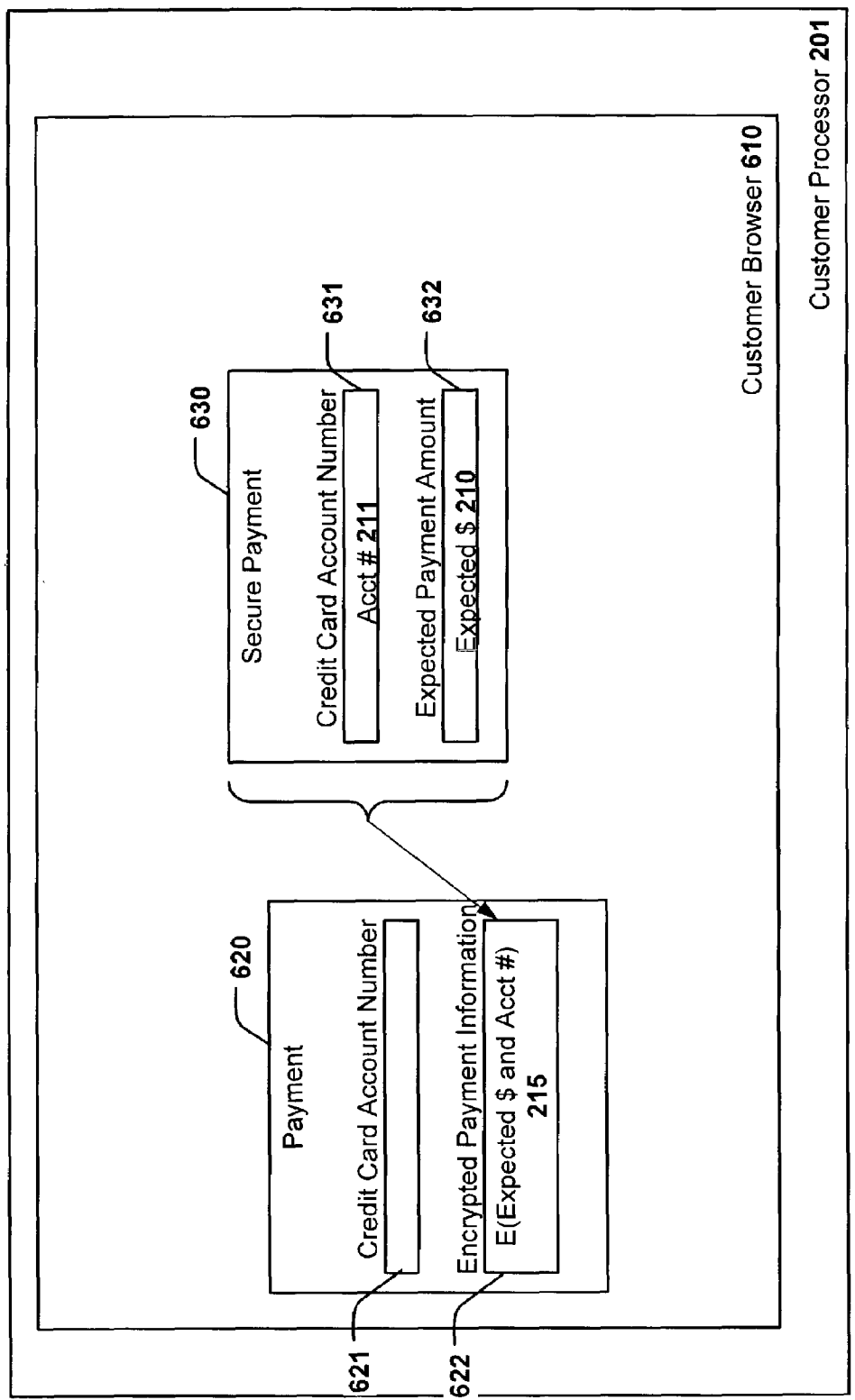
FIG. 6 is a diagram of an illustrative display for ordering an on-line purchase, in accordance with an embodiment of the invention.

As can be seen, the illustrative embodiment described above provides increased security to a customer making an on-line purchase. While the interface with a customer may be implemented in many ways, an illustrative browser display is shown in FIG. 6. As shown in FIG. 6, customer processor 201 executes a customer browser 610, such as for example, Internet Explorer, or the like. The merchant web page may cause a payment information area 620 to be displayed. Payment information area 620 may include a first field 621 for entry of a credit card account number and a second field 622 for entry of encrypted payment information. First field 621 may be used for a conventional on-line purchase. Second field 622 may be used for encryption in accordance with an embodiment of the invention.

Second field 622 may be associated with a Java applet that executes and causes a secure payment information area 630 to be displayed on browser 610. Secure payment information area 630 may include a first field 631 for entry of a credit card account number and a second field 632 for entry of an expected monetary payment amount. The Java applet may receive a credit card account number from first field 631 and an expected monetary payment amount from second field 632. The received credit card account number and expected monetary payment amount may be encrypted, as described above, and copied to second field 215.

As shown, first field 631 contains credit card account number 211 and second field 632 contains expected monetary payment amount 210. The Java applet encrypts, with the private key of the customer processor and the public key of the credit server, expected monetary payment amount 210 and account number 211 into encrypted expected monetary payment amount and account number 215 and copies encrypted expected monetary payment amount and account number 215 to second field 622. Second field 622 may then be treated in a conventional manner, for example, by being encrypted with the private key of the customer processor and the public key of the merchant server, such as is done with a conventional Secure Hypertext Transfer Protocol (S-HTTP) communication.

Alternatively, the interface with a customer may be implemented with a single order entry information area that includes a first field 631 for entry of a credit card account number and a second field 632 for entry of an expected monetary payment amount.

While the illustrative embodiment described above is directed to an on-line purchase, the invention may be applied to any multiple device communication. For example, in another illustrative embodiment, credit server 203 may be a banking server that uses bank account numbers rather than credit card account numbers. Alternatively, merchant server 202 may be a processor associated with an individual selling an item rather than a merchant. In another alternative embodiment, a transaction may occur between two parties through a credit system.

Program code (i.e., instructions) for implementing the above-described systems and methods may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. Program code may also be transmitted over a transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing description has been provided merely for the purpose of explanation and is in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for encryption, comprising:

receiving a first message comprising a first information encrypted with each of a first set of at least two encryption keys, the first information that is encrypted being combined with an non-encrypted second information, the combination of the encrypted first information and the non-encrypted second information within the first message being further encrypted with each of a second set of at least two encryption keys, wherein the first set of at least two encryption keys is different from the second set of at least two encryption keys;

decrypting the first message with each of a third set of at least two encryption keys to yield the non-encrypted second information and the encrypted first information which was encrypted by each of the first set of at least two encryption keys, the third set of at least two encryption keys being different from the first set of at least two encryption keys and the second set of at least two encryption keys;

performing an operation on the non-encrypted second information to derive a third information; and encrypting into a second message, a combination of the third information and the encrypted first information, with each of a fourth set of at least two encryption keys, wherein the third information has not been previously encrypted or decrypted and wherein further, the fourth set of at least two encryption keys is different from the first, second and third sets of at least two encryption keys.

2. The method as recited in claim 1, further comprising sending the second message.

3. The method as recited in claim 1, wherein the first information comprises financial account information, and the second and third information comprise information collateral to the financial account information.

4. The method as recited in claim 1, wherein the second information comprises purchase order information and the third information comprises a monetary invoice amount.

5. The method as recited in claim 1, wherein the first information comprises a credit card account number and an expected purchase amount.

6. The method as recited in claim 1, wherein each set of encryption keys comprises at least a private key and a public key.

7. A method for decryption, comprising:

receiving a message comprising first information encrypted with each of a first set of two or more encryption keys the first information that is encrypted being combined with an non-encrypted second information, the combination of the encrypted first information and the non-encrypted second information within the received message being further encrypted with each of a second set of two or more encryption keys, wherein the first information comprises at least an expected monetary payment amount and a credit card account number and the second information comprises order information;

decrypting the message with each of a third set of two or more encryption keys to yield the non-encrypted second information and the encrypted first information, the third set of two or more encryption keys enabling decryption of information encrypted with the second set of two or more encryption keys; and decrypting the encrypted first information with each of a fourth set of two or more encryption keys to yield the first information, the fourth set of two or more encryption keys enabling decryption of information encrypted with the first set of two or more encryption keys, wherein the first set of two or more encryption keys comprises at least a private key associated with a customer processor and a public key of a finance processor, the second set of two or more encryption keys comprises at least a public key associated with a merchant processor and the private key associated with the finance processor, the third set of two or more encryption keys comprises at least a private key associated with the finance processor and a public key associated with the merchant processor, and the fourth set of two or more encryption keys comprises at least the private key associated with the finance processor and a public key associated with the customer processor, wherein the customer processor encrypts the first information with the first set of two or more encryption keys to inhibit the merchant processor from accessing at least one of the expected monetary payment amount and the credit card account number, wherein the merchant processor utilizes the order information to determine a monetary invoice amount for requesting credit approval, and wherein the finance processor determines whether the monetary invoice amount is greater than the expected monetary payment amount to authenticate the monetary invoice amount and facilitate fraud prevention against fraudulently generated monetary invoice amounts.

8. The method as recited in claim 7, wherein each set of encryption keys comprises a private key and a public key.

9. A computer-readable medium having computer-readable instructions stored thereon for encryption, the instructions when executed on a processor causing the processor to perform:

receiving a message comprising a first information encrypted with each of a first set of at least two encryption keys, the first information that is encrypted being combined with an non-encrypted second information, the combination of the encrypted first information and the non-encrypted second information within the first message being further encrypted with each of a second set of at least two encryption keys, wherein the first information comprises an expected monetary payment amount and a credit card account number and the second information comprises order information;

decrypting the first message with each of a third set of at least two encryption keys to yield the non-encrypted second information and the encrypted first information which was encrypted by each of at least two encryption keys, the third set of at least two encryption keys being different from the first set of at least two encryption keys and the second set of at least two encryption keys;

performing an operation on the non-encrypted second information to derive a third information;

encrypting into a second message, a combination of the third information and the encrypted first information, with each of a fourth set of at least two encryption keys, wherein the third information has not been previously encrypted or decrypted and wherein further, the fourth set of at least two encryption keys is different from the first, second and third set of at least two encryption keys;

decrypting the second message with each of a fifth set of at least two encryption keys to yield the third information and the encrypted first information, the fifth set of at least two keys enabling decryption of the information encrypted with the fourth set of at least two encryption keys; and decrypting with each of a sixth set of at least two encryption keys to yield the first information in a non-encrypted states, wherein the first set of at least two encryption keys comprises at least a private key associated with a customer processor and a public key of a finance processor, the second set of at least two encryption keys comprises at least a public key associated with a merchant processor and the private key associated with the customer processor, the third set of at least two encryption keys comprises at least a private key associated with the merchant processor and a public key associated with the customer processor, the fourth set of at least two encryption keys comprises at least the private key associated with the merchant processor and a public key associated with the finance processor, the fifth set of at least two encryption keys comprises at least the private key associated with the finance processor and public key associated with the merchant processor and the sixth set of at least two encryption keys comprises at least the private key associated with the finance processor and the public key associated with the customer processor.

10. A computer-readable medium having computer-readable instructions stored thereon for decryption, the instructions when executed on a processor causing the processor to perform:

receiving a message comprising first information encrypted with each of a first set of at least two encryption keys the first information that is encrypted being combined with a non-encrypted second information, the combination of the encrypted first information and the non-encrypted second information within the received message being further encrypted with each of a second set of at least two encryption keys, wherein the first information comprises an expected monetary payment amount and a credit card account number and the second information comprises order information;

decrypting the message with each of a third set of at least two encryption keys to yield the non-encrypted second information and the encrypted first information, the third set of at least two encryption keys enabling decryption of information encrypted with the second set of at least two encryption keys; and decrypting the encrypted first information with each of a fourth set of at least two encryption keys to yield the first information, the fourth set of at least two encryption keys enabling decryption of information encrypted with the first set of at least two encryption keys, wherein the first set of at least two encryption keys comprises at least a private key associated with a customer processor and a public key associated with a finance processor, the second set of encryption keys comprises at least a private key associated with a customer processor and the public key associated with the merchant processor, the third set of encryption keys comprises at least a private key associated with the merchant processor and a public key associated with the customer processor, and the fourth set of encryption keys comprises at least the private key associated with the finance processor and a public key associated with the customer processor, wherein the customer processor encrypts the first information with the first set of at least two encryption keys to inhibit the merchant processor from accessing at least one of the expected monetary payment amount and the credit card account number, wherein the merchant processor utilizes the order information to determine a monetary invoice amount for requesting credit approval, and wherein the finance processor determines whether the monetary invoice amount is greater than the expected monetary payment amount to authenticate the monetary invoice amount and facilitate fraud prevention against fraudulently generated monetary invoice amounts.

* * * * *